Figure 1:
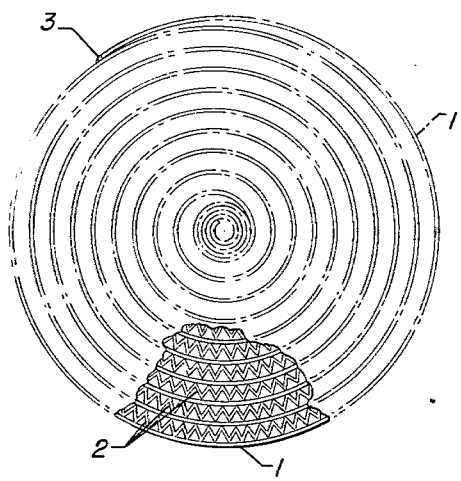

Sept. 28, 1965  N. C. RUFF ETAL  3,208,131
RIGID CATALYTIC METALLIC UNIT AND METHOD
FOR THE PRODUCTION THEREOF
Filed March 22, 1961

INVENTORS:
Norbert C. Ruff
Richard J. Ruff
BY: Chester J. Giuliani
Philip T. Liggett
ATTORNEYS

3,208,131
RIGID CATALYTIC METALLIC UNIT AND METHOD FOR THE PRODUCTION THEREOF
Norbert C. Ruff, Bloomer, Wis., and Richard J. Ruff, Detroit, Mich., assignors, by mesne assignments, to Universal Oil Products Company, Des Plaines, Ill., a corporation of Delaware
Filed Mar. 22, 1961, Ser. No. 97,554
10 Claims. (Cl. 29—157)

This invention relates to an improved type of rigid or self-supporting catalytic metallic unit particularly suitable for use in effecting the catalytic treatment of particle laden streams. Also, the invention is directed to a method for forming and preparing a rigid type of catalytic element, as well as to the limit itself, and means for using or arranging a plurality of elements within a given unit.

Metallic catalyst elements of the improved form of this invention are useful in fume incineration from industrial drying ovens of the type employed for drying enamels, varnishes, etc.; however, they have a substantially non-clogging design and configuration which makes them especially more useful for treating particle laden streams than do conventional catalytic mats or beds. For example, in the incineration of fumes from coffee roasting operations, there is entrained chaff which flows with the vent stream and would clog a conventional catalyst bed or mat. Similarly, numerous other combustible gas streams in industrial operations contain foreign matter which are a problem in effecting their catalytic incineration with conventional means.

It is thus a principal object of this invention to provide a metallic catalyst element of a construction and design useful for placement in particle laden streams.

It is also an object of the invention to provide a method or means for manufacturing a catalytically active element which is of a rigid self-supporting design readily adaptable for mounting in a conduit or reactor chamber for treating the fluid stream.

It is a further object of the invention to provide a thin disc-like element capable of being used with a plurality of similar elements in a given composite unit so as to be capable of accommodating different expansion conditions under varying temperature gradients as well as accommodate entrained foreign matter.

In a broad aspect, the invention embodies a method for producing a catalytic element having a high surface area and low pressure drop characteristics in a manner which comprises the steps of, crimping a strip of metallic ribbon, spirally winding the strip of crimped ribbon with a flat strip of a similar type and size of ribbon and thereby providing alternate layers of a crimped strip and a flat strip within the multiple convolutions of a resulting spiral wound element, holding the element with suitable holding means maintaining the alternate strips in a wound position and in contact with one another, coating said wound element with a compatible metal brazing material and then heating and brazing the element at brazing conditions effecting the joining of points of contact between the adjacent strips of the element, removing the holding means from the brazed element, cleaning the latter and coating it with a thin layer of noble metal.

A preferred form of element utilizes a high temperature resistant alloy of nickel and chromium, or of nickel, chromium and iron, such that the resulting catalytically active element may be used under high temperature conditions for fume oxidation or incinerating operations.

The metallic ribbon is also preferably of a thin gage, being generally less than about .01 of an inch and of relatively narrow widths such that after the spiral winding of the adjacent flat and crimped ribbons the diameter is many times the thickness of the element. The crimping of the metal ribbon may be carried out easily in many ways as, for example, by running a ribbon through two gear members which are engaged with one another. Various sized gears may, of course, be utilized to effect a particular pattern of crimping with small diameter and small toothed gears providing relatively small closely spaced crimps in the ribbon. Sharp toothed gears will provide a V type of crimp while on the other hand round toothed gears will provide more of a wave type of crimp in the ribbon. However, since it is an advantage of the present improved design to have an element that readily passes particulated matter in a gaseous stream, the crimps are preferably placed in the ribbon by straight toothed gearing members rather than by diagonally positioned teeth, such that the resulting open passageways in the spirally wound element, as provided by the crimping, are perpendicular to the width or diameter of the resulting thin disc-like member.

In order to provide a rigid spirally wound element it is subjected to a brazing operation which is carried out by coating the element with a suitable type of brazing compound. For stainless steel alloys a compatible type of high temperature alloy powder or paste coating is applied before subjecting it to a subsequent heating treatment. The element, after the winding operation, is held in place temporarily by suitable tie wires or by a suitable "jig," such that a desired spirally wound form is maintained, with the adjacent strips held in contact with one another while undergoing the brazing operation. As will be more fully set forth hereinafter, when utilizing an alloy metal as the base material, a suitable nickel-chromium brazing powder or paste is also utilized to coat the material for the heating-brazing step. It has also been found advisable to select and use an alloy brazing material that does not contain metals that will be poisonous to the catalytic coating which is to be subsequently applied. For example, a preferred brazing alloy or flux will not contain silica, phosphorus, or iron components when a platinum group metal is to be deposited on the prepared base and provide the activated surface of the element.

It is not intended to limit the present invention to the use of any one catalytic surface; however, for fume incineration purposes, it is generally preferable to utilize platinum or palladium, or a mixture of the two, in a thin fixed layer or deposit which is in turn further treated and activated in a conditioning procedure. For specific catalytic treating operations, other noble metals, as, for example, silver or other metals of the platinum group, as ruthenium, rhodium, osmium and iridium may be used as components in a surface coating. A silver deposit has been found to be advantageously used in the catalytic conversion of methanol to formaldehyde, and in a plant operation effecting the catalytic conversion of ethylene to ethylene oxide. Preferably the noble metal catalytic surface is deposited in a thin fixed layer by an electroplating step, following, of course, suitable preparation steps which include the cleaning of the base element after the brazing step, and an etching step, which in turn provides a dull clean surface adapted for the reception of the electroplated surface.

As an article of manufacture, the present invention thus provides an improved form of rigid or self-supporting catalytically activated metallic unit adapted for use in contacting particle laden gaseous streams, and comprises, at least one disc-like base element formed of spirally wound adjacent strips of flat and crimped ribbon of high temperature resistant alloy, with said flat and crimped strips having brazed fixed connections at all points of contact therebetween in said spirally wound element, and a fixed deposition of a noble metal over said base element providing a catalytic surface thereon.

As hereinbefore noted, relatively narrow width ribbons are used so as to provide resulting spirally wound elements that have a small thickness compared to the diameter, the ratio being such that the thickness is generally less than about one-fourth of the finished diameter. A plurality of elements may however be utilized in a stacked arrangement to provide any desired amount of catalytic surface area to effect the necessary conversion of the gas stream being treated. The use of a relatively thin element has the advantage of better accommodating internal expansion problems as well as providing means for breaking up what could be relatively long straight through flow paths for the stream being treated as it passes through the unit. In other words, the individual elements may be rotated with respect to one another or placed with alternating directions for the spiral windings, such that the flow paths, as provided by the openings between crimps, will be broken and offset at each juncture between any two adjacent elements. This disruption of the flow path also provides a turbulence which tends to dislodge particles as well as provide better surface contact with the gas stream.

The improved rigid element itself, and the method for producing a catalytically activated element or unit of the present design, may be better explained and set forth by reference to the accompanying drawing and the following description thereof.

FIGURE 1 of the drawing indicates diagrammatically a plan view of one embodiment of a spiral wound catalytic element utilizing adjacent layers of crimped and flat ribbon.

Figure 2:
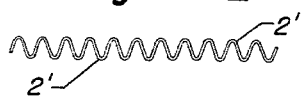
Figure 3:
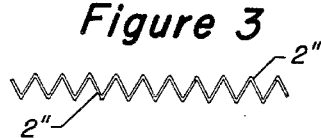

FIGURE 2 indicates a crimping pattern which has small rounded crimps, while FIGURE 3 indicates a somewhat different pattern having the crimps of a more V like shape.

Figure 4:
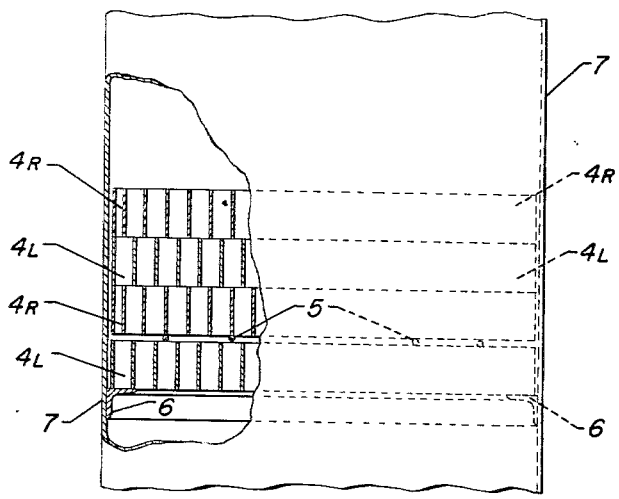

FIGURE 4 of the drawing indicates diagrammatically a combination of a plurality of dis-like elements to provide a stacked unit within a confined conduit or vessel.

Referring now to the drawing, there is shown in FIGURE 1 a resulting flat spirally wound element formed by the mechanical winding together of a flat strip of ribbon 1 with a crimped strip of ribbon 2. Such winding may be readily accomplished by feeding the two adjacent ribbons 1 and 2 together onto a mandrel or shaft which is being rotated to cause the ribbons to build up a disc-like member of any desired diameter. After a predetermined diameter element has been formed, the ribbons are cut so that the end of the outer flat strip 1 is caused to extend slightly beyond the end of the inner crimped strip 2, and such that the end of the flat strip 1 may be tied, tack-welded, or otherwise attached to itself at a point 3. The width of the ribbons 1 and 2 are preferably the same such that a resulting uniform depth or thickness is provided for each element. However, as set forth hereinbefore, the depth or thickness is preferably less than about one-fourth of the diameter of the finished element, and generally less than about one-sixth of the finished diameter.

In FIGURE 2 of the drawing there is shown a relatively small rounded form of crimping in a strip 2', with the width between crimps being about equivalent to the height of the crimp, while in FIGURE 3 there is indicated a strip 2" wtih crimps of a V like shape. The crimping step may be accomplished by running the ribbon through a set of gears, as hereinbefore described, however, it is to be pointed out that it is not intended to limit the present design and construction to any one size or design or crimping inasmuch as many variations may be utilized to advantage in effecting catalytic treatment. Generally V shape crimps are preferred as to form a multiplicity of equilateral triangles in the unit, with less than about ¼" between adjacent convolutions in the flat ribbon, but since once shape or size of crimping may prove better than another for a particular type of entrained solid material in a particular gaseous stream, varying depths and widths in the crimping are contemplated within the scope of the present invention.

Upon the removal of the wound element from the shaft and prior to effecting a brazing thereof, it is advantageous to utilize suitable tie wire means, or an encompassing jig or holder, such that the windings of the element will be held properly in place with adjacent layers of flat and crimped strips in contact with one another. Where a holding jig is utilized, it is preferably of a relatively open design to in turn permit the suitable coating of a brazing material over substantially the entire surface area of the element prior to subjecting it to the heating step by use of a torch or a heat treating oven or the like.

With a preferred base element being formed of an alloy metal, a suitable alloy brazing material is likewise utilized in connection therewith. For example, a paste or powder comprising nickel and chromium is used as a brazing coat over a nickel-chrome element base. The coated element is subjected to a brazing temperature of 1800° F., or more, so as to obtain proper diffusion of the brazing alloy into the base metal. In some instances the temperature may be as high as about 2200° F. inasmuch as the preferred brazing temperature is about 100° to 300° F. above the liquefying temperature of the brazing coating. Also, for a stainless steel alloy type of coating it has been found desirable to effect the brazing in a hydrogen atmosphere and at super-atmospheric conditions.

Where the base element is to be coated with platinum, palladium, or other noble metals, for effecting catalytic oxidation reactions, it is necessary to carefully choose a brazing material which does not contain components which will deactivate the resulting catalytic surface. Thus, such compounds as silica, iron and phosphorus, which have been found to be undesirable, should be eliminated from the brazing compound.

Resulting brazed and rigid elements are subjected to a cleaning operation by use of a suitable detergent or caustic material, as, for example, by immersion in a hot solution of sodium orthosilicate with a surface active agent. Various detergent agents may be utilized and it is not intended to limit the cleaning operation to the use of any one type of agent or solution.

Following the cleaning operation the element is preferably subject to a preconditioning operation, as, for example, the immersion of the element in a solution of ferric chloride and hydrochloric acid until there is a mildly etched surface, however, the strength of the solution and the time utilized in the immersion may be varied in accordance with the nickel-chromium content of the alloy comprising the base of the element. The mildly etched element is then further subjected to a washing operation in order to remove any loose scale or occluded material.

The catalytic surface is preferably deposited by an electroplating operation whereby a thin fixed coating of the noble metal covers the entire surface of the unit. The electro deposition may be carried out in a manner similar to that set forth in Suter et al. Patent No. 2,720,494, issued October 11, 1955, and it is not believed necessary to repeat the similar type of steps herein with respect to the present improved type of elements. However, it may be pointed out that minor variations may be made in effecting the depositing of the noble metal and that varying thicknesses may be obtained by suitable modifications in the time consumed in the electroplating operation. Deposition of silver or of other metals of the platinum group may be carried out in a similar manner. Also, simultaneous deposition may be made of more than one component, as for example, by effecting a coating from a solution containing another element along with platinum, such as iridium or caesium. Such other component being added to the electroplating bath whereby a desired resulting composite is obtained in the electrodeposition.

The conditioning of the catalytic surface, after drying the electroplated element may be carried out at a high temperature above about 600° F., and preferably in the range of 900° F. or higher, and in the presence of hexane or naphtha vapors, such that there is obtained the catalytic oxidation of the hydrocarbon vapors as they pass around and through the element. The oxidation reaction results in the formation of a dull, porous needle-like surface to the coating which is then ready for immediate use in an oxidation or incineration operation. Here again, reference may be made to the above noted Patent No. 2,720,494 for a teaching of a similar type of conditioning in connection with catalytically coated alloy ribbon material.

In some instances it is found desirable to prepare a catalytic element or unit which has had a second electroplating step in order to provide further deposition of the preferred noble metal to the surface thereof, in which case the element is subjected to a second conditioning operation, providing washing and drying and heating operations, the latter step also being carried out in the presence of a combustible vapor such that there is a final activated surface coating ready for use.

As set forth hereinabove, a catalytic unit may actually comprise a plurality of the thin disc-like elements used in side by side or stacked arrangements, so as to provide a greater amount of surface area which will in turn effect the desired oxidation or conversion step. FIGURE 4 of the drawing indicates diagrammatically a stacked arrangement of elements 4L and 4R, each of which are identical in construction, and preparation, placed within a conduit or reactor housing 7. However, the elements 4L are positioned so that the spiraling convolutions of the layers of strips therein run in one direction, as for example clockwise, while the strips forming the spiral convolutions of the elements 4R repose in the opposite direction. This arrangement effects an interruption in the multiplicity of flow paths for a stream passing through the unit, with the accompanying result that there is a certain amount of turbulence interjected into the gaseous stream flow at each of the junctions of adjacent elements. In some instances it may be desirable to place spaced alloy wires or other small spacing elements, such as 5, between one or more of the layers of elements in the unit. Such small spacer means provide a still further change in the turbulent action of the fluid stream passing through the unit, and a means for increasing the changes for dislodgment of entrained foreign matter which might otherwise tend to deposit in the smaller of the V grooves in any one element or at a point of juncture between two adjacent elements where there is a disruption of the flow path through an individual element.

FIGURE 4 of the drawing indicates the plurality of elements 4L and 4R being supported from a suitable shelf angle 6. Where the individual elements are rigid and self-supporting, by reason of the brazing step of this invention, it is possible to eliminate any grid work of the supporting members under the unit.

The use of a plurality of thin elements, such as shown in FIGURE 4, also permits an arrangement which accommodates variations of temperature throughout the stacked unit. In other words, where a gaseous stream passes downwardly through the unit to undergo conversion, there tends to be a greater amount of oxidation or reaction effected in the upper, or first, layer or layers of the unit, and a resulting higher temperature in such layers due to the exothermic reaction. The higher temperature upper elements may then gradually expand and move independently with respect to the cooler lower elements. Whereas, in a unit which comprises a single element of considerable depth there would be a warpage of the unit by virtue of varying temperature from the top and bottom thereof. The elements of FIGURE 4 are indicated as being of the same depth, but it may again be pointed out that varying depth elements may well be used in assemblying a plurality of elements into a given unit to have a particular desired surface arrangement; and further, variable depths and shapes of crimps may be utilized in the formation of adjacent elements of a particular unit.

In order to show the advantage of the present improved design and arrangement over a more conventional catalytic unit formed of a coated mat of crimped alloy metal ribbon, with respect to handling a gaseous stream containing entrained inert matter, the following test procedure and results are set forth.

EXAMPLE

In the test procedure, the two types of catalytic elements were placed in a test chamber having a high temperature flue gas stream pass therethrough with entrained finely divided powder. The test chamber itself comprised an enclosed housing arranged to hold the catalyst elements in a position between a gas circulating blower and a gas outlet stack. A gas burner projecting into the housing provided means to supply the hot flue gas stream, while a tube projecting through the wall to a point adjacent the intake of the blower provided means to introduce powder into the gas stream. The powder used was a white clay filler such as is used in the manufacture of paper. Such clay is of fine grain and generally of the consistency of talc. In addition, a light naphtha was introduced into the heated stream to pass along with the white clay filler material.

One element tested, being designated as D2X–5, comprised a mat of narrow alloy ribbon coated with platinum in the manner hereinabove set forth. Such mat was approximately 5″ thick and relatively loosely packed with the ribbon such that there was a minimum pressure drop exerted against the gaseous stream passing therethrough. The other catalytic unit tested was referred to a Type II unit and was formed of spiral wound elements comprising a plurality of eight ½″ thick spiral elements and two 1″ thick spiral elements, each of which were formed in a manner similar to the procedure set forth hereinbefore, and were placed one against the other in a side by side arrangement. Each element used a crimped ribbon which was formed to have generally V shaped crimps of about ¼″ height and on approximately ⁵⁄₁₆″ centers.

Reference to the following Tables I and II will indicate operating conditions, including rates for introducing the powder into the stream being treated, changes in pressure drop, an indication of conversion in terms of odor in the outlet stack, as well as the quantity of powder held in the respective test units as a measure of the amount of clogging that had occurred with each type of design.

Table I

OPERATION WITH D2X-5 (COATED RIBBON IN MAT FORM)

| Entry Temp., °F. | Discharge Temp., °F. | Pressure Drop | S.c.f.m. | Odor | Remarks |
|---|---|---|---|---|---|
| 550 | 630 | .185 | 70 | Very faint | Initial Conditions with Powder addition at rate of 1 lb. per 20 Minutes. |
| 550 | 600 | .225 | | Faint | After 1 lb. of Powder. |
| 550 | 600 | .240 | | Strong | After 2 lbs. of Powder. |
| 550 | 590 | .290 | | Stronger | After 3 lbs. of Powder. |
| 550 | 580 | .330 | | do | After 3½ lbs. of Powder. |
| 550 | 560 | .350 | | do | After 4 lbs. of Powder. |

Weight Clean = 6 lbs. ½ oz.
Weight of Unit removed after test = 6 lbs. 13 oz.
Weight of Powder held in Unit = 12.5 ounces.

Table II

OPERATION WITH TYPE II UNIT (8½" THICK ELEMENTS AND 2-1" THICK ELEMENTS OF ½" x .005" CHROMEL "A" RIBBON)

| Catalyst Entry Temp., °F. | Catalyst Discharge Temp., °F. | Pressure Drop | S.c.f.m. | Odor | Remarks |
|---|---|---|---|---|---|
| 550 | 630 | .72 | 71 | Some | Initial Conditions as Powder was being added at rate of 1 lb. per 15 Minutes. |
| 550 | 620 | .72 | | do | After 1 lb. of Powder. |
| 550 | 610 | .73 | | do | After 2 lbs. of Powder. |
| 550 | 600 | .74 | | Slight | After 3 lbs. of Powder. |
| 550 | 600 | .81 | | do | After 4 lbs. of Powder. |
| 550 | 600 | .81 | | do | After 5 lbs. of Powder. |

Weight of Unit Clean = 6 lbs. 14 oz.
Weight of Unit After Test = 6 lbs. 15 oz.
Powder held in Unit = 1.0 ounce.

A composition of the test results readily shows that the Type II unit held much less powder at the end of the test period and appeared to be capable of use over an extended period of time without any clogging problems.

We claim as our invention:

1. A method of preparing a catalytic metallic element, which comprises the steps of, crimping a strip of high temperature resistant alloy ribbon, spirally winding the strip of crimped ribbon with a flat strip of a similar type and size of ribbon and thereby providing alternate layers of a crimped strip and a flat strip within the multiple convolutions of a resulting spirally wound element, holding said element with holding means maintaining the alternate strips in a wound position and in contact with one another, coating said wound element with a brazing alloy and then heating and brazing said coated element at brazing conditions to form alloy brazed fixed connections at all points of contact between said strips of said element, removing said holding means from said brazed element, cleaning the latter and coating it with a thin layer of a noble metal.

2. A method for preparing a catalytically active metallic element which comprises the steps of, crimping a strip of high temperature resistant alloy ribbon, spirally winding the strip of crimped ribbon with a flat strip of a similar type and size of ribbon and thereby providing alternate layers of a crimped strip and a flat strip in the multiple convolutions of a resulting element, holding said spiral wound element with holding means maintaining the alternate strips in wound position and in contact with one another, coating said wound element with a brazing alloy and then heating and brazing said coated element at brazing conditions to form alloy brazed fixed connections at all points of contact between said strips of said element; releasing said holding means from the resulting rigid brazed element, cleaning the latter in a metal cleaning solution and washing to remove adhering material, mildly etching the surface of said element by immersion in an acidic solution, depositing a thin coating of a noble metal, rinsing and drying said element and then heating it in the presence of combustible vapors to effect ignition and sustained combustion of vapors on the surface of the element whereby a resulting rigid activated and conditioned metallic element is formed.

3. The method of claim 2 further characterized in that said deposit of noble metal coating is effected by electrodeposition, whereby to provide a substantially uniform thin deposit of said noble metal.

4. The method of claim 2 further characterized in that the heating of the element is effected at a temperature of above about 600° F.

5. The method of claim 2 further characterized in that after effecting a first deposit of a noble metal and heating of the coated element there is a subsequent electrodeposition of the noble metal coating to provide an additional layer of said metal and a further heating in the presence of combustible vapors.

6. The method of claim 1 further characterized in that said alloy ribbon comprises nickel and chromium and said noble metal layer on the formed element comprises a major proportion of platinum.

7. The method of claim 1 further characterized in that said alloy ribbon comprises nickel and chromium and said noble metal layer on the formed element comprises a major proportion of palladium.

8. The method of claim 1 further characterized in that said alloy ribbon comprises nickel and chromium and said noble metal layer on the formed element comprises a major proportion of silver.

9. The method of claim 1 further characterized in that said alloy ribbon comprises nickel and chromium and in that said brazing alloy also comprises nickel and chromium.

10. The method of claim 1 further characterized in that the surface of said brazed element is mildly etched prior to the coating thereof with the noble metal.

References Cited by the Examiner

UNITED STATES PATENTS

| | | | |
|---|---|---|---|
| 1,400,204 | 12/21 | Backhaus | 252—477 |
| 1,930,285 | 10/33 | Robinson | 29—455 |
| 2,045,632 | 6/36 | Colby | 252—477 X |
| 2,539,248 | 1/51 | Lynch et al. | 29—527 |
| 2,720,494 | 10/55 | Suter et al. | 252—470 |
| 2,878,560 | 3/59 | Gier | 29—455 |
| 2,975,144 | 3/61 | Gross et al. | 252—477 |

FOREIGN PATENTS

| | | |
|---|---|---|
| 7,909 | 7/08 | Great Britain. |
| 753,658 | 7/56 | Great Britain. |
| 569,999 | 2/59 | Canada. |
| 1,065,816 | 9/59 | Germany. |

MORRIS O. WOLK, *Primary Examiner.*

GEORGE D. MITCHELL, *Examiner.*